(12) United States Patent
Hanson et al.

(10) Patent No.: US 7,753,329 B2
(45) Date of Patent: Jul. 13, 2010

(54) UNIVERSAL EQUIPMENT MOUNT

(75) Inventors: Niles Hanson, Eugene, OR (US); Andy Wilson, Eugene, OR (US); Jon Gilbert, Eugene, OR (US); Gary Hanson, Boise, ID (US)

(73) Assignee: Rosen Sunvisor Systems, LLC, Eugene, OR (US)

( * ) Notice: Subject to any disclaimer, the term of this patent is extended or adjusted under 35 U.S.C. 154(b) by 689 days.

(21) Appl. No.: 11/114,644

(22) Filed: Apr. 25, 2005

(65) Prior Publication Data

US 2006/0237608 A1     Oct. 26, 2006

(51) Int. Cl.
     *E04G 3/00* (2006.01)
(52) U.S. Cl. ............. 248/278.1; 248/282.1; 248/284.1; 248/183.1; 248/184.1
(58) Field of Classification Search ................. 248/918, 248/276.1, 282.1, 284.1, 183.1, 184.1, 183.2, 248/281.11, 278.1
See application file for complete search history.

(56) References Cited

U.S. PATENT DOCUMENTS

| | | |
|---|---|---|
| 1,806,059 A | 5/1931 | Hopple |
| 2,439,009 A | 10/1943 | Kujawski |
| 3,096,061 A | 7/1963 | Bertell |
| 3,367,616 A | 2/1968 | Bausch et al. |
| 4,066,231 A | 1/1978 | Bahner et al. |
| 4,222,680 A | 9/1980 | Browning |
| 4,254,931 A | 3/1981 | Aikens et al. |
| 4,367,968 A | 1/1983 | Ishida |
| 4,382,572 A | 5/1983 | Thompson |
| 4,632,348 A | 12/1986 | Keesling et al. |
| 4,872,630 A * | 10/1989 | Cooper ..................... 248/278.1 |
| 4,936,533 A | 6/1990 | Adams et al. |
| 5,056,854 A | 10/1991 | Rosen |
| 5,127,700 A | 7/1992 | Joe et al. |
| D397,660 S | 9/1998 | Rosen |
| 5,845,885 A | 12/1998 | Carnevali |
| 6,007,135 A | 12/1999 | Alves |
| 6,131,986 A | 10/2000 | Rosen |
| D443,573 S | 6/2001 | Finlayson et al. |
| 6,394,403 B1 * | 5/2002 | Hung ....................... 248/276.1 |
| 6,585,201 B1 | 7/2003 | Reed |
| 6,769,657 B1 * | 8/2004 | Huang ...................... 248/278.1 |
| D520,449 S * | 5/2006 | Shiraishi et al. ............ D13/133 |
| 7,048,242 B2 * | 5/2006 | Oddsen, Jr. ............. 248/280.11 |
| D533,174 S * | 12/2006 | Richter ...................... D14/251 |
| 7,207,537 B2 * | 4/2007 | Hung ....................... 248/284.1 |
| 2006/0157627 A1 * | 7/2006 | Hung ....................... 248/276.1 |

OTHER PUBLICATIONS

Rosen Sunvisor Systems, Universal Mount Sunvisor System, webpage, Jun. 16, 2004, pp. 1-2.

* cited by examiner

*Primary Examiner*—J. Allen Shriver, II
*Assistant Examiner*—Steven M Marsh
(74) *Attorney, Agent, or Firm*—Chernoff, Vilhauer, McClung & Stenzel, LLP

(57) ABSTRACT

A universal mount for mounting equipment to a surface in a desired orientation.

10 Claims, 2 Drawing Sheets

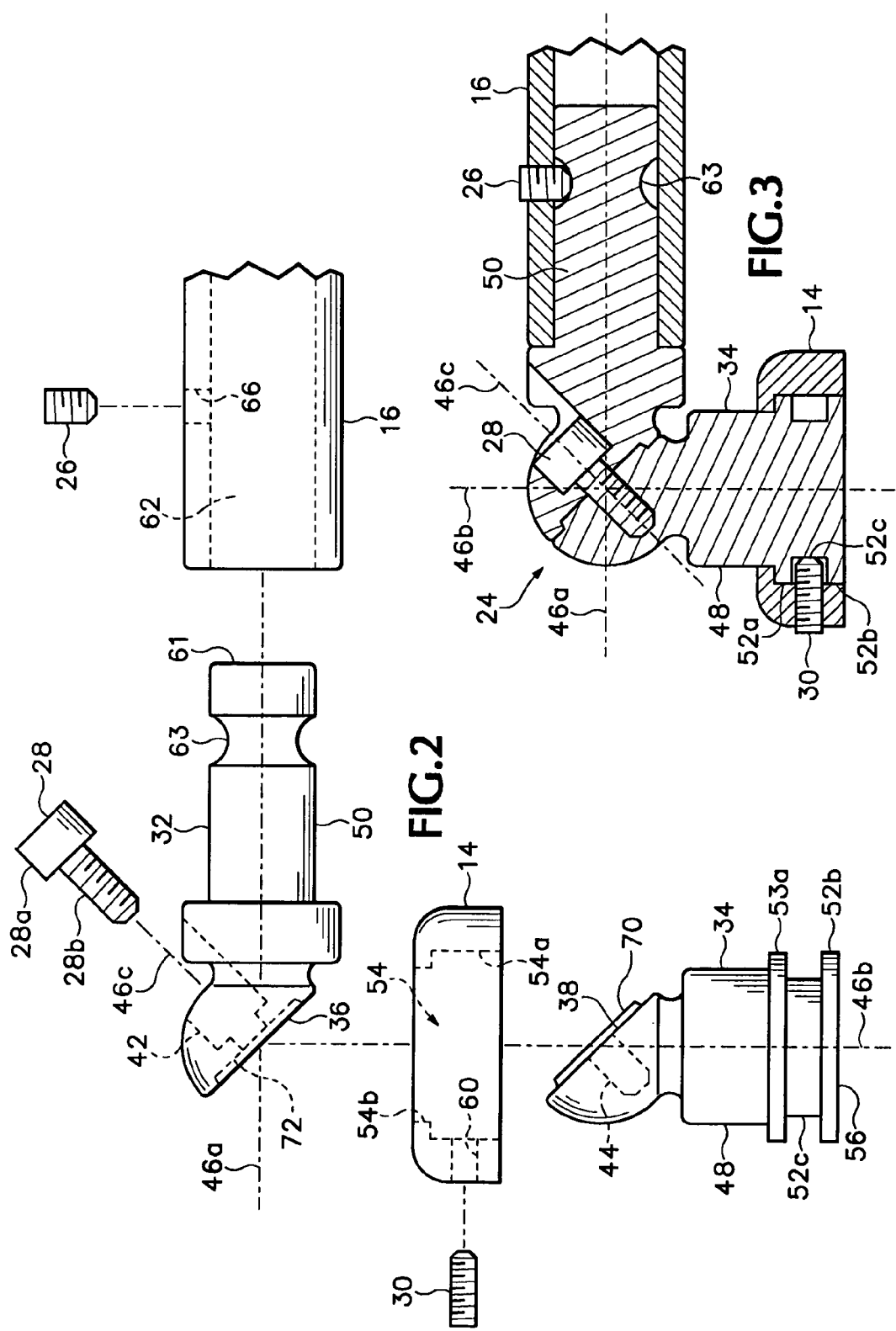

UNIVERSAL EQUIPMENT MOUNT

BACKGROUND OF THE INVENTION

Figure 1:
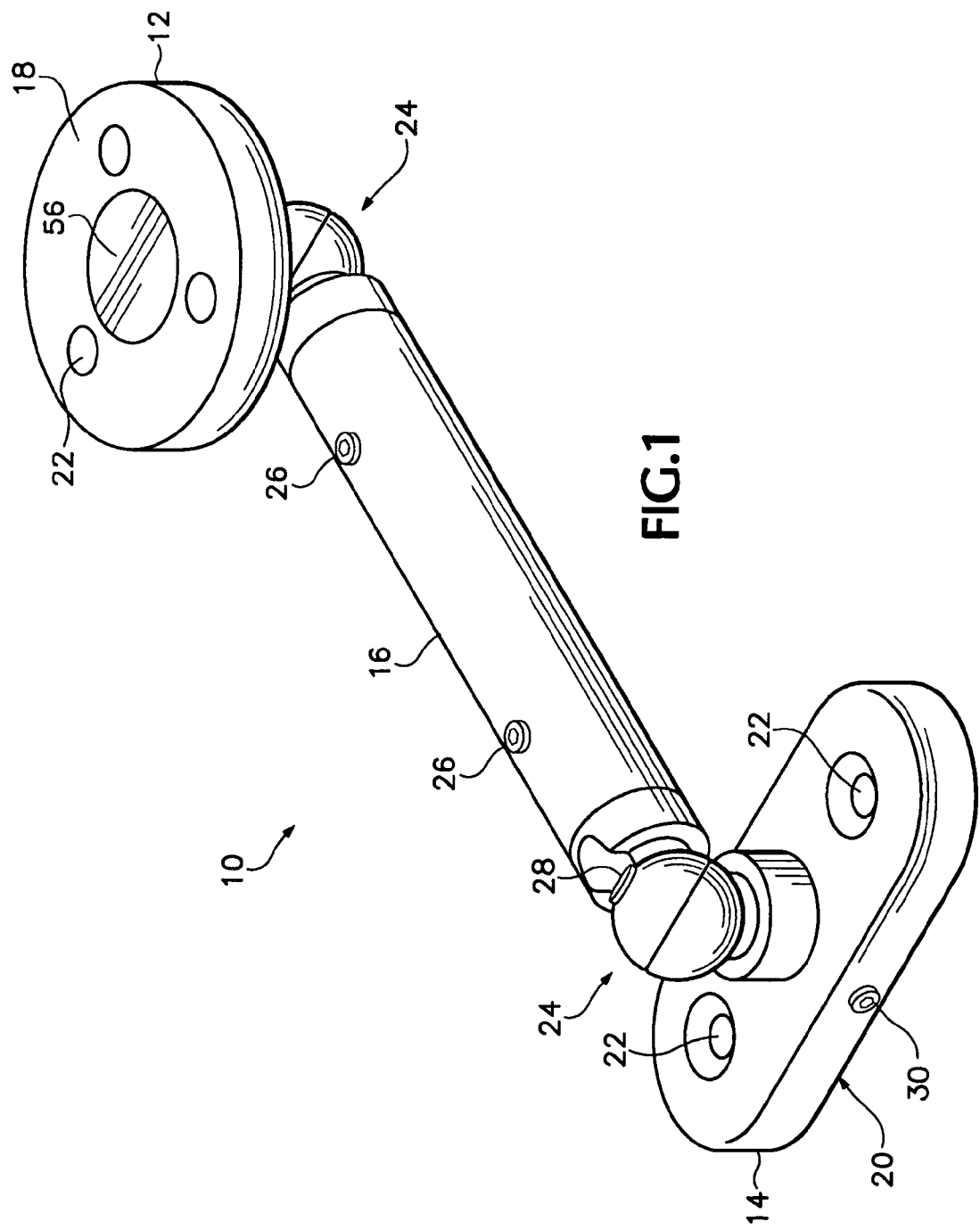

The present invention relates to a universal mount for mounting a equipment to a surface in a desired orientation, and in particular, relates to a universal mount for mounting equipment to the windshield or side panel of an aircraft or other vehicle where it may be desired to support the piece of equipment substantially laterally with respect to the support.

Existing universal mounts for mounting equipment to a side or front surface of a vehicle, like an aircraft, a car, a boat, etc. are used to mount relatively lightweight accessories such as sun visors, etc. This is due to two reasons. First, universal mounts typically employ ball joints to facilitate a wide range of adjustment of the orientation of the sun visor or other lightweight accessory. The mounts, and in particular the ball joints, are often limited in terms of the torque, or moment, that they are able to adjustably support while maintaining the ability to manually tighten the ball joint to a secured orientation or manually loosen the ball joint from a secured orientation. Stated differently, if a universal mount were to laterally support a heavy object, the requisite force necessary to securely tighten the joint of the universal mount may be too great to either manually apply when tightening the joint or manually overcome when loosening the joint. A second, related reason, is that even when sufficient manual force may be applied to operate a joint that laterally supports a heavy accessory, the universal nature of the joint results in the heavy object tending to tilt downwards when loosened even when it is only desired to adjust the lateral angular orientation of the accessory, such that upon loosening the universal joint, one hand must be devoted to supporting the heavy object until the joint is tightened again with the other hand. This makes adjustment of heavy accessories supported by universal joints awkward.

An additional problem associated with universal mounts for vehicle accessories is that such accessories typically include an attachment plate securable to a planar surface, a universal joint, and an adapter matingly engageable with a particular type accessory. For example, because sun visors are typically thin and elongate with a cylindrical upper tube for a base, the adapter for a universal sun visor mount will typically comprise an elongate prong insertable into the tube of the sun visor. The universal sun visor mount, however, may not be used to support other types of accessories such as an altimeter, wind gauge, etc.

What is desired, therefore, is an improved universal equipment mount.

BRIEF DESCRIPTION OF THE SEVERAL DRAWINGS

FIG. 1 shows a perspective view of an equipment mount.
FIG. 2 shows an exploded view of the mount of FIG. 1.
FIG. 3 shows a partial sectional view of the mount of FIG. 1.

DETAILED DESCRIPTION OF PREFERRED EMBODIMENTS

FIG. 1 shows an equipment mount 10 having two opposed mounting plates 12 and 14 interconnected with each other by an extender 16. The mounting plates 12 and 14 each preferably have a substantially planar face 18 and 20, respectively, to facilitate attachment of each plate to a planar surface, such as a piece of equipment, a windshield, a floor, or other structural support. The attachment plates 12 and 14 may each include one or more bores 22 by which a respective mounting plate may be selectively secured a piece of equipment, and the other respective mounting plate selectively secured to a windshield, a floor, or other structural support. Preferably, the bore 22 is beveled so that the head or other outwardly flanged portion of a bolt, pin, or other fastener may rest securely within a respective bore while attached to the aforementioned structural member or piece of equipment.

The equipment mount 10 may be used to attach a piece of equipment to a structural support member of a vehicle. For example, among other applications, the equipment mount 10 may be used to secure an altimeter to the interior sidewall of an aircraft, or a sonar device to the floor of a fishing boat, etc. In each of these applications, the equipment being mounted to the vehicle may either require a particular orientation, or have an optimal orientation, with respect to the person using or viewing the equipment. For example, using the previous example of the attachment of a sonar device to a fishing boat, it may be desired to have the viewing screen of the sonar device below and to the side of a driver or passenger, while tilted upwards towards the face of the person or driver. Thus, the optimal or required orientation depends on unknown conditions or variables such as the height of a user, the position of a seat, etc. Similarly, the angular orientation of the surface of the structure to which the equipment is to be secured may also vary from application to application.

In order to facilitate the attachment of attachment plates 12 and 14 to either a surface or a piece of equipment in as wide a range of orientations as possible, the equipment mount 10 includes joints 24 that each interconnect a respective attachment plate 12 or 14 to the extender 16 such that a respective one, or both, of the planar faces 18 or 20 may be independently rotated about a selective one, or more, axes of rotation. The extender 16, which connects the joints 24, permits an attached piece of equipment to be secured to a support such that, not only can the angular orientation of the equipment with respect to the support be adjusted, but also permits the vertical or horizontal position of the equipment with respect to the support to be adjusted, as well as the lateral distance from the support. Further, the equipment mount 10 includes one or more locking members, such as 26, 28, or 30, capable of restricting the range of motion of a respective one of the attachment plates 12 or 14 independently of the other attachment plate.

Preferably, the each of the joints 24 by which a respective attachment plate 12 and 14 is attached to the extender 16 permits rotation of a respective face 18 or 20 about three axes of rotation. In this manner, and as explained more fully later in the specification, a piece of equipment attached to a structural support using the disclosed equipment mount will have a range of motion that may include up to six degrees of freedom, i.e. the piece of equipment may be rotated independently about as many as six different axes relative to the support to which it is attached.

Some embodiments of the mount 10, though, may include joints 24 that permit rotation of a respective face about only two axes, or even one axis. Furthermore, some embodiments that, like the disclosed embodiment, include joints 24 each permitting rotation of an attachment plate about three axes of rotation, may nonetheless provide an attached piece of equipment with less than six degrees of freedom if there is one or more common axes of rotation shared by the joints 24. Similarly, though the mount 10 depicted in FIG. 1 shows each attachment plate 12 and 14 connected to the extender 16 by a disclosed joint 24, some embodiments of the mount 10 may only have one of the attachment plates 12 or 14 connected to the extender by a disclosed joint 24. Also, though the mount 10 shows attachment plate 12 as having a generally circular profile and attachment plate 14 as having a generally oval profile, these shapes are merely illustrative as the respective attachment plates may have matching shapes, or shapes other than of a circular or oval profile.

FIGS. 1-3 show an equipment mount 10 having a joint 24 capable of imparting the aforementioned range of motion to a piece of equipment attached to the disclosed mount 10. Specifically, a joint 24 may include a first portion 32 and a second portion 34 each having a longitudinal axis 46a and 46b, respectively, and each having respective connection faces 36 and 38 pressingly engageable with each other and securable together by a first locking member 28, which may be a set screw, a pin, or other fastening device.

The first locking member 28 may have a head portion 28a and a cylindrical threaded portion 28b having a diameter narrower than that of the head portion 28a. The first member 32 may preferably define a hole 42 having a first bore 42a of a diameter slightly wider than that of the head portion 28a of the first locking member 28 and a second bore 42b slightly wider than the threaded portion 40b of the first locking member 28. The second member 34 may define a threaded hole 44 also slightly wider than the threaded portion 28b of the first locking member 40. Thus when the respective faces 36 and 38 are pressed together, the locking member 28 may be inserted into the hole 42 such that the head portion 28 is held in a recessed position within the first bore 42a of the hole 42, and the threaded portion 280b of the locking member 28 extends into a threaded engagement with the threaded hole 44.

When the first portion 32 and the second portion 34 of the joint 24 are engaged with each other by the locking member 28, selective rotation of the locking member may either lock the respective portions 32 and 34 into a fixed angular orientation with each other, or alternately permit angular rotation of the respective portions 32 and 34 with respect to each other about a rotational axis 46c through the locking member 28 and generally perpendicular to each of the faces 36 and 38.

Each of the faces 36 and 38 of the first portion 32 and the second portion 34, respectively, may be tilted at an approximate 45-degree angle with respect to the longitudinal axes 46a and 46b, respectively, of the first portion 36 and the second portion 38. Thus rotation of the portions 32 and 34 with respect to each other causes relative rotation of the longitudinal axes 46a and 46b about one another between a position of mutual alignment and several positions 90-degrees offset from each other, such as the one shown in FIG. 3.

The second portion 34 may include a generally cylindrical base 48 having two collar members 52a and 52b, respectively, each having a wider diameter than that of the base 48. The mounting plates 12 and 14, as shown in FIGS. 2 and 3 with respect to plate 14, may each define a hole 54 having a third bore 54a having a diameter slightly larger than that of the collar members 52a and 52b, and a fourth bore 54b having a diameter slightly larger than the base 48. In this manner, the mounting plate 14 may be fitted over the second portion 34 so that the plate 14 rests on the collar 52a, and the surface 20 (shown in FIG. 1) is mounted flush with the bottom surface 56 of the second portion 34 to form a substantially planar surface to which a desired piece of equipment may be mounted. Between the respective collars 52a and 52b is a groove 52c into which a threaded pin 30, extending through threaded bore 60 of the plate 14 may selectively bear against to alternately permit or restrict rotation of the plate 14, and hence any piece of equipment mounted to the plate 14 about the axis 46b. It should be understood that the foregoing illustration of the attachment of plate 14 to a second portion 34 also illustrates the attachment of plate 12 to a second portion 34.

The first portion 32 may have a distal end 61 that is generally cylindrical in shape having a diameter of a size to be rotatably, but snugly received into a cavity 62 of the extender 16 along with a groove 63. The threaded pin 26 may be inserted through a threaded bore 66 of the extender 16 to selectively bear against the groove 63 of the distal end 61 of the first portion 32 when it is inserted into the extender 16. Loosening or tightening the pin 26 alternately permits or restricts rotation of the first portion 32 about the axis 46a, hence also permits or restricts rotation of any piece of equipment mounted to attachment plate 12 (or 14) about the axis 46a, where the piece of equipment is laterally displaced from the axis 46a by a distance determined by the relative rotational position of face 36 with respect to face 38.

As can be easily seen with respect to FIG. 2, and as described above, assembly of an equipment mount 10 may be accomplished by sliding the respective mounting plates 12 and 14 over a respective second portion 34 until the mounting plates 12 and 14 respectively rest against a collar 52a and then inserting the locking member 30 into the bore 60 and rotating the pin until it extends into the groove 52c. Once the attachment plates 12 and 14 are secured, the faces 36 and 38 may be pressed together and similarly secured by the insertion of the locking member 28 into the hole 42. The respective first portions 32 may be inserted into the extender 16 and secured with the locking member 26.

Thus assembled, the mount 10 may impart to an attached piece of equipment a wide range of motion by selectively loosening a selective one or more of the six pins 26, 28, and 30 so that an attachment plate 12 and/or 14, and hence any attached piece of equipment, may be selectively rotated about one or more of the axes 46a, 46b, or 46c. Because the assembled mount includes two attachment plates connected by an extender with a joint 24 at either end, an assembled mount 10 may have up to six degrees of freedom, i.e. when one attachment plate is secured to a support such as a floor or a wall, a piece of equipment mounted to the other attachment plate 12 or 14 may be rotated around six independent axes to a desired orientation. It should be noted however, that the exemplary mount 10 shown in FIG. 10 has only five degrees of freedom because the two respective axes 46a at either end of the extender 16 are always aligned. If the extender 16 were curved or cornered, however, the mount 10 would provide a full six degrees of freedom.

It should also be noted that, due to the generally spherical shape of the joint 24 at either end of the extender depicted in FIG. 1, it may appear that the joints are standard ball joints when they are not. First, the spherical configuration is somewhat arbitrary in that a cubical or other configuration would also impart the described range of motion, though the spherical shape helps insure that the respective faces 36 and 38 may be rotated a full 360-degrees with respect to each other. Second, adjustment of a ball joint is often unwieldy because, once loosened, an attached piece of equipment is free to move about all of three mutually perpendicular axes running through the center of the ball joint, which may not be desired, particularly if the equipment is heavy and adjustment about only one or two axes is what is desired. Like a ball joint, either of the two disclosed joints 24 of an assembled mount 10 may be rotated about any of three perpendicular axes running through the center of a selective joint 24, but unlike a ball joint, rotation about any of those axes may be individually restricted to facilitate greater control in adjusting the orientation of an attached piece of equipment, and in particular a heavier piece of equipment. Preferably, as is shown in FIGS.

1-3, each of the locking members 26, 28, and 30 permit an attachment plate to be locked into any desired potion within the range of movement about the axis that the respective locking member alternately permits or restricts.

Preferably, the universal equipment mount 10 is capable of supporting a torque, or moment, about each of its joints 24 of approximately 10 foot-pounds at any orientation of an attached piece of equipment. The disclosed mount 10, for example, which has an extender 16 approximately six inches long, is capable of securely supporting a piece of equipment that weighs 20 pounds at any desired orientation, even one that extends directly laterally outward from a support such as a windshield or side panel of a vehicle. The present inventors have discovered that this strength may be achieved by including a joint 24, and extender 16, each made of aluminum and each approximately one-half inch in diameter. To further resist rotation of the faces 36 and 38 relative to each other when the joint 24 is clamped, the second portion 34 may include a face 38 having an inwardly tapered, generally cylindrical central protrusion 70 that is matingly received within a similarly tapered cavity 72 in the surface 36 at the first portion 32. In the disclosed joint 24, the amount of the taper is three degrees. The tapered protrusion 70 provides a "wedged" engagement surface that, when clamped by the fastener 28, resists relative rotation of the surfaces 36 and 78 about the axis 46c. The present inventors, through experimentation, have found that the disclosed ½ inch diameter joint 24 provides the requisite space for a protrusion 70 having a sufficient area in its tapered circumferential engagement surface to securely support the aforementioned 20 pound piece of equipment. It should be understood though, that other materials, such as steel, composite, etc, and/or other dimensions may provide equal or greater strength. The inventors have also discovered that each of the joints 24 may be manually loosened and/or locked by each of the disclosed, independent locking members 26, 28, and 30 when the joints 24 support a piece of equipment that applies up to a 10 foot-pound moment at the joint 24 adjacent the support to which the piece of equipment is attached.

The terms and expressions that have been employed in the forgoing specification are used therein as terms of description and not of limitation, and there is no intention in the use of such terms and expressions of excluding equivalence of the features shown and described or portions thereof, it being recognized that the scope of the invention is defined and limited only by the claims which follow.

The invention claimed is:

1. An apparatus for mounting equipment to a surface, said apparatus comprising:
   (a) an elongate extender having a first end and a second end;
   (b) a first mount receivable in said first end and a second mount receivable in said second end, said first mount having a substantially planar first face selectively securable to at least one of said equipment and said surface, said first face capable of a first range of movement when said first mount is received in said first end and when said second mount is received in said second end, said first range of movement including rotation about respective first, second, and third axes where said first axis extends along a longitudinal centerline of said elongate extender throughout said first range of movement, said second axis extends orthogonally through said first face throughout said first range of movement, and said third axis has a fixed diagonal relationship to each of said first and second axes throughout said first range of movement;
   (c) said second mount having a substantially planar second face selectively securable to at least one of said equipment and said surface, said second face capable of a second range of movement when said first mount is received in said first end and when said second mount is received in said second end, said second range of movement including rotation about respective fourth, fifth, and sixth axes where said fourth axis extends along a longitudinal centerline of said elongate extender throughout said second range of movement, said fifth axis extends orthogonally through said second face throughout said second range of movement, and said sixth axis has a fixed diagonal relationship to each of said fourth and fifth axes throughout said second range of movement; and
   (d) at least one locking apparatus capable of selectively disabling a respective one of said first range of movement and said second range of movement without restricting the one of said first range of movement and said second range of movement not selectively disabled.

2. The apparatus of claim 1 including plural ones of said locking apparatus, each associated with a respective one of said first face and said second face.

3. The apparatus of claim 2 where a first said locking apparatus, associated with said first face, includes a first locking member selectively, alternately enabling and disabling rotation about said third axis without disabling rotation about either of said first axis and said second axis, and said second locking apparatus, associated with said second face, includes a second locking member selectively, alternately enabling and disabling rotation about said sixth axis without disabling rotation about either of said fourth axis and said fifth axis.

4. The apparatus of claim 3 where said first locking apparatus includes a third locking member selectively, alternately enabling and disabling rotation about said first axis without disabling rotation about either of said second and third axes, respectively, and said second locking apparatus includes a fourth locking member selectively, alternately enabling and disabling rotation about said fourth axis without disabling rotation about either of said fifth axis and said sixth axis.

5. The apparatus of claim 4 where said first locking apparatus includes a fifth locking member selectively, alternately enabling and disabling rotation about said second axis without disabling rotation about either of said first and third axes, respectively, and said second locking apparatus includes a sixth locking member selectively, alternately enabling and disabling rotation about said fifth axis without disabling rotation about either of said fourth axis and said sixth axis.

6. The apparatus of claim 1 where said first and second mounts together provide equipment mounted to said apparatus a range of motion having five degrees of freedom.

7. The apparatus of claim 6 where each of said degrees of freedom may be individually restricted.

8. The apparatus of claim 1 where said first mount provides equipment mounted to said apparatus a range of motion having three degrees of freedom and includes a first locking member that selectively restricts rotation about a first one of said three degrees of freedom.

9. The apparatus of claim 8 where said first mount includes a second locking member that selectively removes a second one of said three degrees of freedom.

10. The apparatus of claim 9 where said first mount includes a third locking member that selectively removes a third one of said three degrees of freedom.

* * * * *